United States Patent
Robillard et al.

(10) Patent No.: US 11,086,739 B2
(45) Date of Patent: Aug. 10, 2021

(54) SYSTEM COMPRISING NON-VOLATILE MEMORY DEVICE AND ONE OR MORE PERSISTENT MEMORY DEVICES IN RESPECTIVE FAULT DOMAINS

(71) Applicant: EMC IP Holding Company LLC, Hopkinton, MA (US)

(72) Inventors: Michael Robillard, Shrewsbury, MA (US); Adrian Michaud, Carlisle, MA (US); Dragan Savic, Toronto (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 168 days.

(21) Appl. No.: 16/555,516

(22) Filed: Aug. 29, 2019

(65) Prior Publication Data

US 2021/0064489 A1     Mar. 4, 2021

(51) Int. Cl.
*G06F 11/00* (2006.01)
*G06F 11/20* (2006.01)
(Continued)

(52) U.S. Cl.
CPC ........ *G06F 11/203* (2013.01); *G06F 11/0727* (2013.01); *G06F 11/0793* (2013.01); *G06F 11/3034* (2013.01); *H04L 67/1097* (2013.01)

(58) Field of Classification Search
CPC ............... G06F 11/203; G06F 11/0727; G06F 11/0793; G06F 11/3034; G06F 11/16; G06F 11/1666; G06F 11/2033; G06F 11/2053; G06F 11/2056; G06F 11/2058; G06F 11/2094; H04L 67/1097

See application file for complete search history.

(56) References Cited

U.S. PATENT DOCUMENTS

| | | |
|---|---|---|
| 5,442,747 A | 8/1995 | Chan et al. |
| 2005/0044342 A1 | 2/2005 | Wilson |
| | (Continued) | |

OTHER PUBLICATIONS

Elserougi, Ahmed A., Ahmed M. Massoud, and Shehab Ahmed. "A switched-capacitor submodule for modular multilevel HVDC converters with DC-fault blocking capability and a reduced number of sensors." IEEE Transactions on Power Delivery 31, No. 1 (2015): pp. 313-322. (Year: 2015).*

(Continued)

*Primary Examiner* — Anthony J Amoroso
(74) *Attorney, Agent, or Firm* — Ryan, Mason & Lewis, LLP

(57) ABSTRACT

A system includes a host processor, a volatile memory device coupled to the host processor, and at least a first persistent memory device coupled to the host processor. The host processor is configured to execute one or more applications. The volatile memory device and the first persistent memory device are in respective distinct fault domains of the system, and at least one of a plurality of data objects generated by a given one of the applications is accessible from multiple distinct storage locations in respective ones of the distinct fault domains. For example, the host processor and the volatile memory device may be in a first one of the distinct fault domains and the first persistent memory device may be in a second one of the distinct fault domains. The data object remains accessible in one of the fault domains responsive to a failure in another of the fault domains.

20 Claims, 5 Drawing Sheets

(51) Int. Cl.
*G06F 11/07* (2006.01)
*H04L 29/08* (2006.01)
*G06F 11/30* (2006.01)

(56) References Cited

U.S. PATENT DOCUMENTS

| | | | |
|---|---|---|---|
| 2006/0195801 A1 | 8/2006 | Iwamura | |
| 2012/0303999 A1* | 11/2012 | Calder | G06F 11/1471 714/6.3 |
| 2013/0275699 A1 | 10/2013 | Cheriton | |
| 2014/0365707 A1 | 12/2014 | Talagala et al. | |
| 2015/0032975 A1 | 1/2015 | Ruberg et al. | |
| 2015/0186215 A1* | 7/2015 | Das Sharma | G06F 15/16 714/6.23 |
| 2017/0185645 A1 | 6/2017 | Agarwal et al. | |
| 2017/0269956 A1 | 9/2017 | Shacham et al. | |
| 2017/0351452 A1 | 12/2017 | Boyd et al. | |
| 2018/0018171 A1 | 1/2018 | Amidi et al. | |
| 2018/0095884 A1 | 4/2018 | Kaminski et al. | |
| 2019/0004940 A1 | 1/2019 | Boyd et al. | |
| 2019/0149341 A1 | 5/2019 | Robison et al. | |

OTHER PUBLICATIONS

Pfister, Gregory F. "An introduction to the infiniband architecture." High performance mass storage and parallel I/O 42, pp. 617-632 (2001): 102. (Year: 2001).*
Sassone, Peter. Commercial trends in off-chip communication. Technical Report, Georgia Institute of Technology, 2003. (Year: 2003).*
Kevin Marks, "An NVM Express Tutorial," Flash Memory Summit, 2013, 92 pages.
NVM Express, "NVMe Specification," Revision 1.3, May 1, 2017, 282 pages.
U.S. Appl. No. 15/956,309 filed in the name of Adrian Michaud Apr. 18, 2018 and entitled "Storage System with Binding of Host Non-Volatile Memory to One or More Storage Devices."
Gen-Z Consortium, "Gen-Z Overview," 2016, 8 pages.
D. Das Sharma, "Compute Express Link," CXL White Paper, Mar. 2019, 3 pages.
U.S. Appl. No. 16/444,577 filed in the name of Michael Robillard Jun. 18, 2019 and entitled "Host Processor Configured with Instruction Set Comprising Resilient Data Move Instructions."

* cited by examiner

SYSTEM COMPRISING NON-VOLATILE MEMORY DEVICE AND ONE OR MORE PERSISTENT MEMORY DEVICES IN RESPECTIVE FAULT DOMAINS

FIELD

The field relates generally to information processing systems, and more particularly to host processors and associated storage devices in information processing systems.

BACKGROUND

Information processing systems are increasingly utilizing high performance non-volatile memory to implement storage services accessible to host processors. For example, such systems can be configured for direct attachment of newly-developed persistent memory (PMEM) or storage class memory (SCM) devices. These devices promise significant improvements in terms of increased durability and lower latency. Unfortunately, systems are often not suitably configured to take full advantage of the enhanced functionality offered by such devices. For example, conventional system data paths and associated control paths utilized in conjunction with PMEM or SCM devices are unduly limited and therefore unable to provide features such as enhanced data resiliency and system fault tolerance.

SUMMARY

Illustrative embodiments provide improved system data paths and associated control paths that support advantageous features such as enhanced data resiliency and system fault tolerance using PMEM or SCM devices.

In one embodiment, a system includes a host processor, a volatile memory device coupled to the host processor, and at least a first persistent memory device coupled to the host processor. The host processor is configured to execute one or more applications. The volatile memory device and the first persistent memory device are in respective distinct fault domains of the system, and at least one of a plurality of data objects generated by a given one of the applications is accessible from multiple distinct storage locations in respective ones of the distinct fault domains. For example, the host processor and the volatile memory device may be in a first one of the distinct fault domains and the first persistent memory device may be in a second one of the distinct fault domains, with the data object remaining accessible in one of the first and second fault domains responsive to a failure in the other one of the first and second fault domains. Numerous other arrangements involving multiple fault domains and one or more persistent memory devices are possible.

These and other illustrative embodiments include, without limitation, apparatus, systems, methods and computer program products comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, cloud-based systems, as well as other types of storage systems comprising various combinations of physical and virtual processing resources. Information processing systems as disclosed herein can therefore be implemented as enterprise systems, cloud-based systems, or in other configurations. A given such information processing system can include compute nodes or other types of processing devices that utilize an underlying storage system comprising one or more storage devices.

Figure 1:
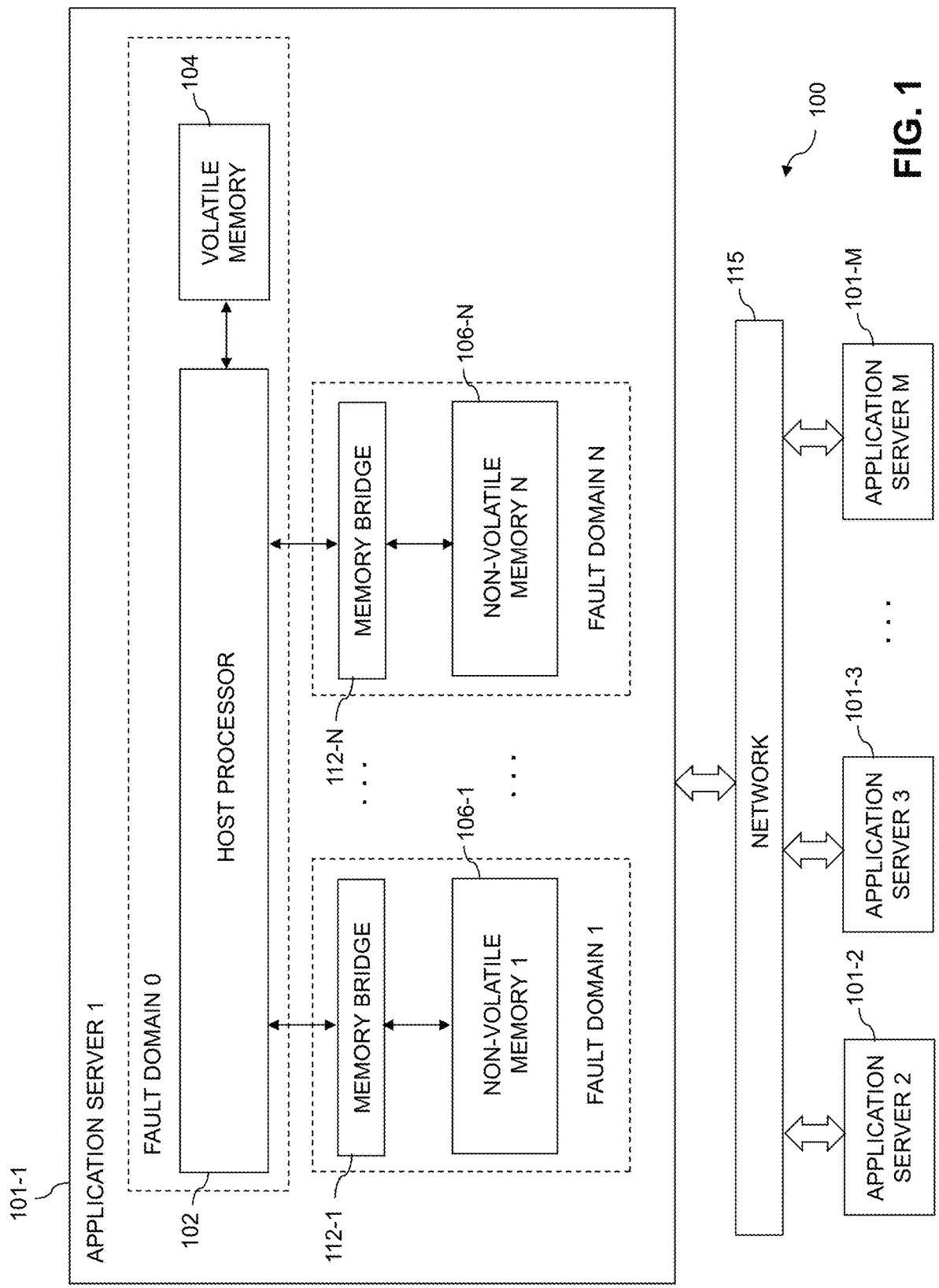
FIG. 1 is a block diagram of an information processing system comprising a plurality of application servers each with multiple fault domains in an illustrative embodiment.

FIG. 1 shows an information processing system 100 configured in accordance with an illustrative embodiment. The system 100 comprises a plurality of application servers 101-1, 101-2, 101-3, . . . 101-M, each coupled to a network 115. The application servers 101-1, 101-2, 101-3, . . . 101-M are also denoted as Application Server 1, Application Server 2, Application Server 3, . . . Application Server M, respectively. The application server 101-1 as illustrated in the figure comprises a host processor 102, a volatile memory 104 coupled to the host processor 102, and a plurality of storage devices each also coupled to the host processor 102. Each of the other application servers 101-2 through 101-M is assumed to be configured in a manner similar to that illustrated for application server 101-1. The application servers 101 are illustratively implemented using respective computers or other types of processing devices each comprising a processor coupled to a memory.

The storage devices in this embodiment are implemented as respective Non-Volatile Memory (NVM) devices 106-1 through 106-N, also denoted in the figure as Non-Volatile Memory 1 through Non-Volatile Memory N. These NVM devices 106 in some embodiments comprise PMEM or SCM devices. Other types of storage devices can be used in other embodiments, and the term "storage device" as used herein is intended to be broadly construed. For example, such storage devices can include respective memory-addressable storage devices of various types. The NVM devices 106-1 through 106-N are coupled to the host processor 102 via respective memory bridges 112-1 through 112-N.

The host processor 102 illustratively comprises components such as a Basic Input/Output System (BIOS), one or more processor cores, and one or more memory controllers, although these components are not explicitly shown in the figure. Those skilled in the art will appreciate that the host processor 102 can include additional or alternative components of a type commonly found in such a host processor.

In some embodiments, the volatile memory 104 is coupled to a memory controller of the host processor 102. Each of the NVM devices 106 can include a separate internal controller, although such components are not explicitly shown in the figure, for clarity and simplicity of illustration.

The host processor 102 may comprise a central processing unit (CPU) or other type of processor implemented in a computer or other processing device. The host processor 102 may be part of physical infrastructure that is utilized to implement virtual machines, containers or other virtual processing devices.

The NVM devices 106 may be part of a storage area network (SAN) or other type of network of the system 100. In some embodiments, data transfer in the system 100 can utilize techniques such as remote direct memory access (RDMA) connections over InfiniBand or Gigabit Ethernet. Numerous other types of connections and associated data transfer protocols can be used in other embodiments. For example, some embodiments are configured to utilize protocols such as compute express link (CXL).

Although the volatile memory 104 is shown as separate from the host processor 102 in the FIG. 1 embodiment, in other embodiments the volatile memory 104 may be at least partially incorporated into the host processor 102. Accordingly, a volatile memory associated with a host processor in a given embodiment may comprise an internal volatile memory of the host processor. Numerous other arrangements are possible for volatile memory associated with a given host processor.

The volatile memory 104 of the host processor 102 illustratively comprises dynamic random access memory (DRAM). The use of DRAM in the volatile memory 104 provides the host processor 102 with a very low access times to read and write stored data, typically less than about 20 nanoseconds for both read and write operations. Non-volatile memory such as NAND-based flash memory typically has significantly higher access times, and in some cases may have minimum block size restrictions.

The NVM devices 106 in some embodiments are implemented using memory technologies that exhibit performance capabilities similar to those of DRAM or other types of volatile RAM. Examples of these and other non-volatile alternatives to flash memory that may be utilized to provide at least a portion of the NVM devices 106 include resistive RAM, ferroelectric RAM (FRAM), nano-RAM (NRAM), phase change RAM (PC-RAM), spin-transfer torque magneto-resistive RAM (STT-MRAM) and Intel Optane™ devices based on 3D XPoint™ memory, although other types of memories can be used in other embodiments. Such NVM devices are examples of what is also referred to herein as "high performance" non-volatile memory. These high performance non-volatile memory devices may be viewed as examples of the PMEM and SCM devices referred to elsewhere herein.

It is also possible in other embodiments that the NVM devices 106 can comprise NAND-based flash memory, rather than high performance non-volatile memory of the types mentioned above. For example, the NVM devices 106 can comprise respective flash-based solid state drives (SSDs).

In some embodiments, the NVM devices 106 more particularly comprise NVM Express (NVMe) storage devices, configured to operate in accordance with the NVMe Specification, Revision 1.3, May 2017, which is incorporated by reference herein. Additional or alternative storage protocols such as NVMe over Fabric (NVMeOF) can be utilized in illustrative embodiments.

Although the NVM devices 106 are directly connected to the host processor 102 in the FIG. 1 embodiment, other arrangements are possible. For example, PCIe connections can be used to support communications between the host processor 102 and the NVM devices 106. Alternative embodiments can use alternative types of interfaces such as Serial Attached SCSI (SAS) and Serial ATA (SATA). Again, numerous other interfaces and associated protocols can be used in other embodiments.

The host processor 102 in some embodiments is configured with an instruction set that may include resilient data move instructions of the type described in U.S. patent application Ser. No. 16/444,577, filed Jun. 18, 2019, now U.S. Pat. No. 10,922,078, and entitled "Host Processor Configured with Instruction Set Comprising Resilient Data Move Instructions," which is incorporated by reference herein in its entirety. The resilient data move instructions illustratively include at least first and second move instructions of the instruction set of the host processor 102, for respectively moving data from a register to memory and for moving data from memory to a register. It is to be appreciated, however, that other embodiments can utilize additional or alternative instructions. Use of the above-noted resilient data move instructions is therefore not a requirement in illustrative embodiments disclosed herein.

It is assumed that the instruction set of the host processor 102 comprises conventional instructions of types known to those skilled in the art, in addition to or in place of the above-noted resilient data move instructions.

In some embodiments, the host processor 102 is configured as a reduced instruction set computer (RISC) device. For example, the host processor 102 can be configured with an instruction set architecture (ISA) that comprises RISC-like micro-operations, possibly with support for hidden registers, possibly modified to include the above-noted first and second move instructions to support resilient data movement within the system 100. Other types of RISC or RISC-like ISAs may be used.

In other embodiments, the host processor 102 can be configured as a complex instruction set computer (CISC) device. For example, the host processor 102 in such embodiments may comprise an otherwise conventional x86 processor configured with an x86 ISA that is modified to include the above-noted first and second move instructions to support resilient data movement within the system 100. Such CISC devices can also utilize RISC-like micro-operations, possibly with support for hidden registers.

The system 100 is configured to provide improved system data paths and associated control paths that support advantageous features such as enhanced data resiliency and system fault tolerance using PMEM or SCM devices. Such PMEM or SCM devices are examples of what are more generally referred to herein as "persistent memory devices" and in system 100 are illustratively implemented as respective NVM devices such as NVM devices 106 of application server 101-1 and other NVM devices similarly contained within other ones of the application servers 101. References herein to "persistent memory devices" should therefore be understood to encompass SCM devices, as well as other types of NVM devices.

The host processor 102 of the application server 101-1 is configured to the host processor being configured to execute one or more applications, illustratively on behalf of one or more system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The application server 101-1 in the present embodiment includes multiple distinct fault domains that support the above-noted data paths and associated control paths. The volatile memory 104 and the NVM devices 106 are in respective distinct fault domains, illustratively denoted as Fault Domain 0, Fault Domain 1, . . . Fault Domain N. More particularly, the host processor 102 and the volatile memory 104 are in Fault Domain 0, and the NVM devices 106-1 through 106-N are in respective ones of Fault Domain 1 through Fault Domain N. Each of the other application servers 101 is assumed to have a similar arrangement of distinct fault domains. Other arrangements of application server components into fault domains can be used in other embodiments.

The one or more applications executed by the host processor 102 of the application server 101-1 generate data objects, such as data pages, data blocks, data files, etc. At least one data object generated by a given one of the applications is accessible from multiple distinct storage locations in respective ones of the distinct fault domains. For example, the data object illustratively remains accessible in one of first and second fault domains responsive to a failure in the other one of the first and second fault domains. The first fault domain in such an arrangement illustratively comprises Fault Domain 0 and the second fault domain illustratively comprises one of Fault Domain 1 through Fault Domain N. The term "responsive to" as used here is intended to be broadly construed, so as to encompass, for example, terms such as "in the event of" and other similar constructs. Also, the term "responsive to" as broadly used herein should not be construed as requiring a particular temporal relationship between a detected event and its associated response.

In some embodiments, the memory bridge 112-1 of Fault Domain 1 is implemented in a multi-ported host bus adaptor (HBA) of the application server 101-1. A first one of the ports of the multi-ported HBA is illustratively coupled to the host processor 102 and provides a cache coherent interface configured to transport cache lines to and from the host processor 102. A second one of the ports of the multi-ported HBA is illustratively coupled to the network 115 and is configured to support data transfers over the network 115 to and from other ones of the application server 101 of system 100. The other memory bridges 112 can be similarly implemented in respective multi-port HBAs. The multi-port HBAs in some embodiments illustratively comprise respective dual-port HBAs, although additional ports may be present in a given HBA in other embodiments.

Responsive to a failure in Fault Domain 0 that includes the host processor 102 and the volatile memory 104, the data object remains accessible, for example, in the NVM device 106-1 of Fault Domain 1 via the second port of the multi-ported HBA, and/or in another one of the NVM devices 106 via the second port of its corresponding multi-ported HBA.

In some embodiments, an inbound data transfer received via the second port of the multi-ported HBA of Fault Domain 1 causes a cache invalidation command to be transferred via the first port of the multi-ported HBA to the host processor 102.

The memory bridge 112-1 of the multi-port HBA in such embodiments is illustratively configured to implement local processing functionality within its corresponding application server, including one or more of the following:

1. Storage protocol bridging.
2. Command initiation and response for the first and second ports.
3. Acceleration for at least one of encryption, decryption, compression and decompression.
4. Intelligent offloading of data objects from the NVM device 106-1 to other storage devices of the system 100.
5. Movement of data objects between multiple storage tiers of the system 100.
6. Movement of data objects between multiple application servers 101 of the system 100 responsive to a failure in one of the application servers 101.

A particular one of the data objects generated by a given application executed by the host processor 102 is illustratively stored in multiple ones of the fault domains of the application server 101. For example, the data object can be stored in volatile memory 104 of Fault Domain 0, and in NVM devices 106 of two or more of Fault Domain 1 through Fault Domain N. Numerous other arrangements involving storage of a data object in multiple fault domains of application server 101 can be used.

The data object is illustratively stored in respective distinct storage locations of first and second ones of the NVM devices 106, such that responsive to a failure in one of the first and second NVM devices 106, the data object remains accessible in the other one of the first and second NVM devices 106.

As a more particular example, responsive to a failure in at least one of the host processor 102 and the volatile memory 104 of the application server 101-1, a particular one of the data objects generated by the given application and stored in a storage location of one of the NVM devices 106 of the application server 101-1 remains accessible over the network 115 to at least one of the other application servers 101.

In some embodiments, one or more of the data objects generated by the given application are controllably offloaded from the first and second NVM devices 106 to one or more other storage devices of the system under specified conditions. The one or more data objects can also be controllably restored from the one or more other storage devices to the first and second NVM devices 106 under specified conditions.

Additionally or alternatively, data can be transferred across the fault domains of the application server 101-1 using high-speed serial interconnects provisioned with direct current blocking capacitors to prevent faults from crossing between the fault domains.

These and other particular data paths, control paths and their corresponding features and functionality as described above are presented by way of illustrative example only, and can be varied in other embodiments. Such features and functionality should therefore not be construed as limiting in any way.

Also, particular features and functionality described above in the context of the application server 101-1 and its components are assumed to be similarly present in each of the other ones of the application servers 101.

Additional details regarding illustrative embodiments of improved system data paths and associated control paths will be provided below in conjunction with the flow diagram of FIG. 2 and the additional system diagrams of FIGS. 3, 4 and 5.

It should also be noted that system 100 may comprise additional or alternative components relative to those explicitly shown in FIG. 1. For example, various types of networks can be included in system 100, possibly comprising one or more PCIe switches or other types of switch fabrics arranged between the application servers 101. Also, different numbers, types and arrangements of host processors, storage devices and other components can be used in other embodiments.

In some embodiments, the NVM devices 106 are part of a larger storage platform. For example, the NVM devices 106 can be part of a "fast tier" or other type of front-end storage tier of a multi-tier storage system. Such a storage system can further comprise a "capacity tier" or other back-end storage tier, possibly comprising one or more object stores, including cloud-based object stores such as Amazon Simple Storage Service (S3), Google Cloud Platform Cloud Storage, and Microsoft Azure Blob Storage. Accordingly, cloud-based implementations of the storage system are possible.

A given storage platform that includes NVM devices 106 can comprise any of a variety of different types of storage including network-attached storage (NAS), storage area networks (SANs), direct-attached storage (DAS) and distributed DAS, as well as combinations of these and other storage types, including software-defined storage.

Additionally or alternatively, the storage platform can comprise storage arrays such as VNX®, Symmetrix VMAX® and Unity™ storage arrays, commercially available from Dell EMC. Other types of storage products that can be used in implementing a given storage platform in an illustrative embodiment include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage platform in an illustrative embodiment.

These and other storage platforms can be part of what is more generally referred to herein as a processing platform comprising one or more processing devices each comprising a processor coupled to a memory. A given such processing device may correspond to one or more virtual machines or other types of virtualization infrastructure such as Docker containers or other types of Linux containers (LXCs). By way of example, the host processor 102 and possibly other components of the system 100 may be implemented at least in part using processing devices of such processing platforms.

As indicated above, communications between elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

As a more particular example, some embodiments may utilize one or more high-speed local networks in which associated processing devices communicate with one another utilizing PCIe cards of those devices, and networking protocols such as InfiniBand, Gigabit Ethernet or Fibre Channel. Numerous alternative networking arrangements are possible in a given embodiment, as will be appreciated by those skilled in the art.

Again, it should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, a host device having multiple CPU sockets each with a separate instance of volatile cache memory is considered a type of "host processor" as that term is broadly used herein. Numerous other types and arrangements of host processors can be incorporated into a higher-level device such as computer, server or other host device. The term "host processor" as used herein is therefore intended to be broadly construed.

The operation of the system 100 will now be further described with reference to the flow diagram of FIG. 2. The process as illustrated in this figure is suitable for use in the system 100 but is more generally applicable to other types of systems each comprising at least one host processor and one or more storage devices. The particular process as illustrated in FIG. 2 represents an illustrative example of an arrangement providing enhanced data resiliency and system fault tolerance using PMEM or SCM devices, although it is to be appreciated that alternative arrangements can be implemented using other processes in other embodiments. The process as illustrated in FIG. 2 comprises steps 200 through 208, and may be implemented in a given one of the application servers 101 of the system 100, or in other types of processing devices. Different instances of the FIG. 2 process are illustratively implemented in different ones of the application servers 101.

In step 200, a system is configured with multiple fault domains including a first fault domain comprising a host processor and a volatile memory and one or more additional fault domains comprising respective persistent memory devices. For example, each of at least a subset of the application servers 101 of the system 100 can be configured to include multiple fault domains in this manner.

In step 202, the host processor executes applications to generate data objects.

In step 204, the data objects are each made accessible in multiple storage locations in respective distinct fault domains.

In step 206, a determination is made as to whether or not a failure is detected in a given one of the fault domains. If such a failure is detected, the process moves to step 208, and otherwise returns to step 202 as indicated.

In step 208, which is reached responsive to detection of a failure in a given one of the failure domains in step 206, the data objects of the failed fault domain remain accessible via another one of the fault domains. The process then returns to step 202 in which the host processor continues to execute applications to generate data objects.

Figure 2:
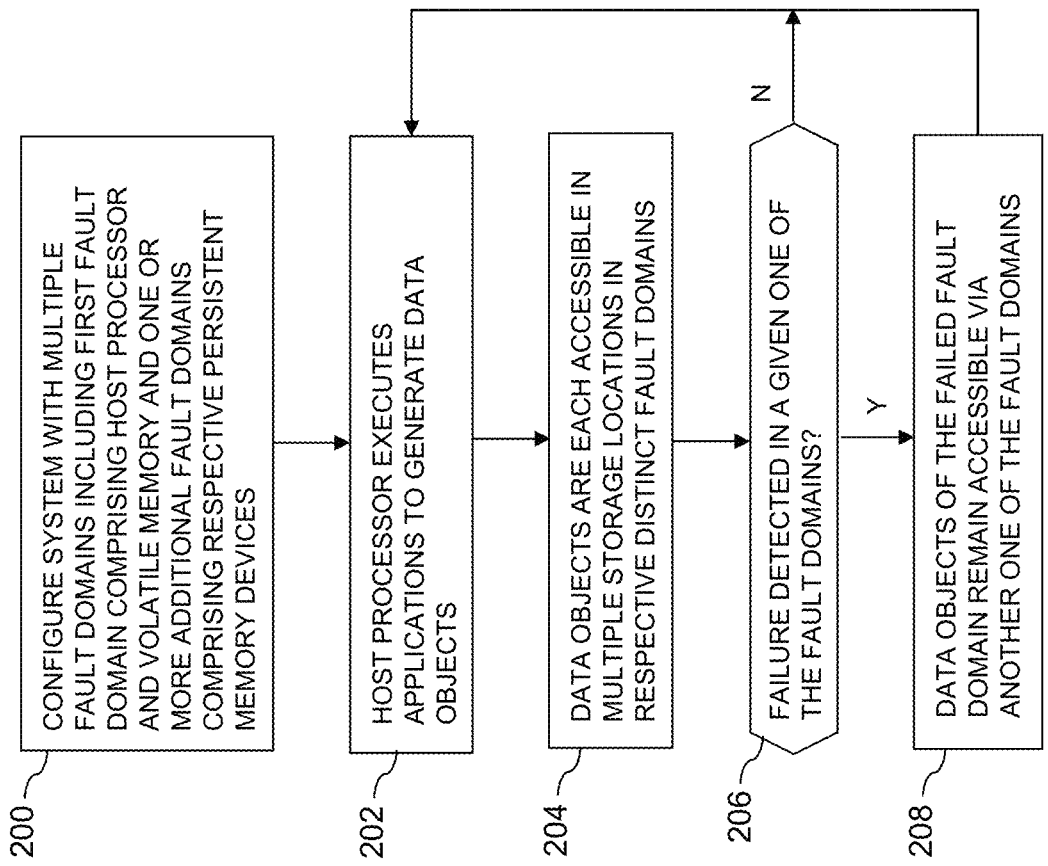
FIG. 2 is a flow diagram showing the operation of the FIG. 1 system in an illustrative embodiment.

The particular processing operations and other system functionality described in conjunction with the flow diagram of FIG. 2 are presented by way of illustrative example only, and should not be construed as limiting the scope of the invention in any way. Alternative embodiments can use other types of processing operations involving a host processor and at least one storage device. For example, the ordering of the process steps may be varied in other embodiments, or certain steps may be performed concurrently with one another rather than serially. Also, one or more of the process steps may be repeated periodically, or multiple instances of the process can be performed in parallel with one another. For example, as indicated previously, multiple instances of the process can be active in parallel on respective ones of the application servers 101 of system 100.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments will now be described with reference to the example systems shown in FIGS. 3, 4 and 5.

Figure 3:
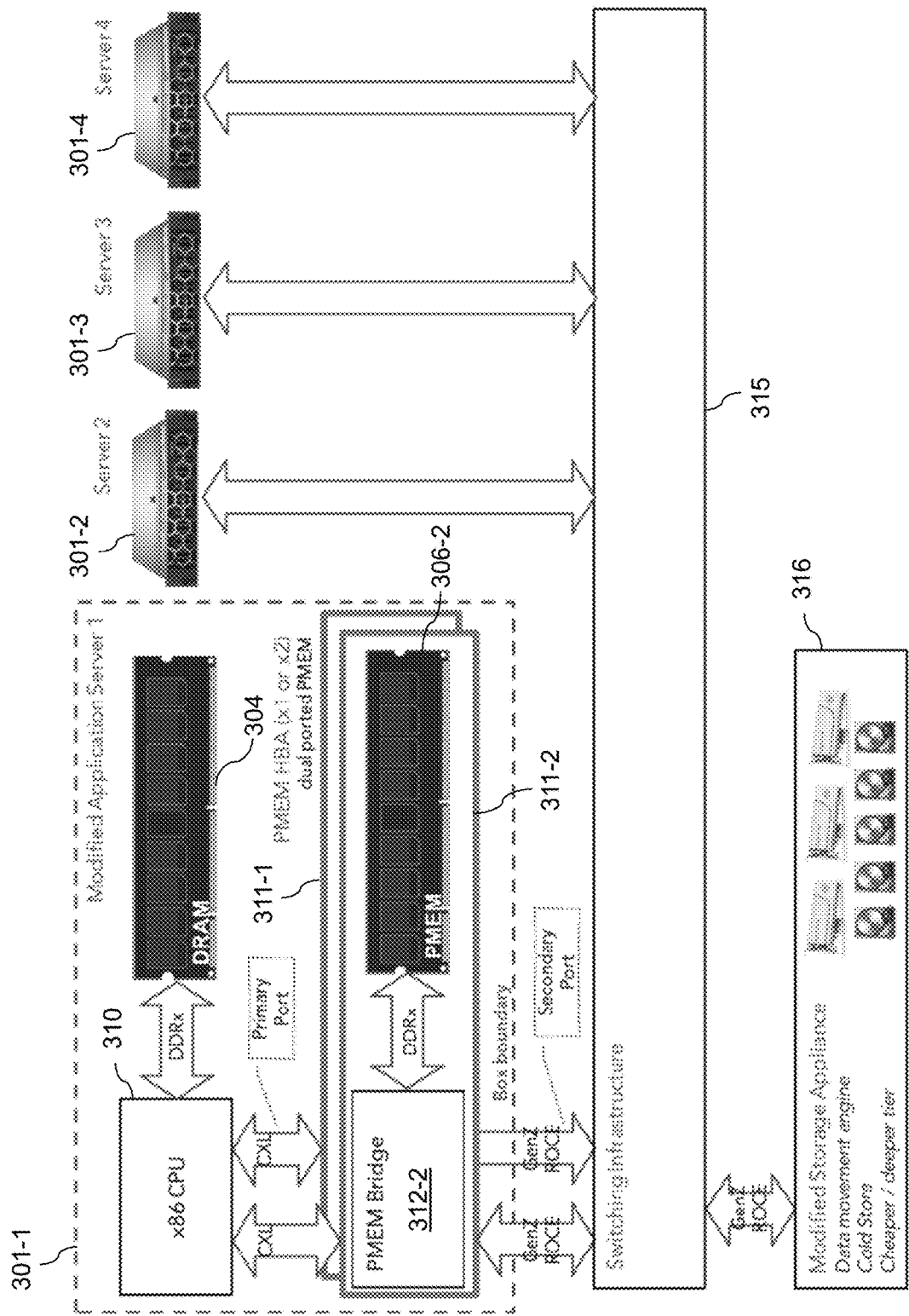
FIG. 3 shows another example of an information processing system comprising a plurality of application servers each with multiple fault domains in an illustrative embodiment.

Referring initially to FIG. 3, a system 300 comprises a plurality of application servers 301-1, 301-2, 301-3 and 301-4 coupled to switching infrastructure 315. The application servers 301 are also referred to as Server 1, Server 2, Server 3 and Server 4. The switching infrastructure 315 is an example of what is more generally referred to herein as a "network." Also coupled to the switching infrastructure 315 is a modified storage appliance 316. The modified storage appliance 316 illustratively comprises a data movement engine and at least one of a "cold" store and a "cheaper/deeper" tier.

Additional redundant infrastructure, such as one or more other instances of switching infrastructure 315 and/or modified storage appliance 316, may be present but is not explicitly shown. A given such storage appliance is referred to herein as "modified" in that it is implemented as a storage appliance configured to support an improved data plane and associated control plane as disclosed herein. These and other references to "modified" components herein should not be construed as limiting in any way, nor as admissions regarding conventional arrangements.

A first one of the application servers 301-1 comprises a host processor illustratively implemented as an x86 CPU 310. The first application server 301-1 and other application servers 301 are also referred to herein as "modified" application servers in that a given such server illustratively comprises an application server configured to support an improved data plane and associated control plane as disclosed herein.

The application server 301-1 further comprises a volatile memory implemented as DRAM 304, and first and second dual ported HBAs 311-1 and 311-2 each comprising a PMEM bridge and an associated PMEM store. For example, as can be seen in the figure, HBA 311-2 comprises PMEM bridge 312-2 and PMEM store 306-2. The other HBA 311-2 is assumed to be configured in a similar manner. Although two HBAs are shown in this embodiment, configured to provide a PMEM HBA x2 arrangement, different numbers of HBAs are possible, including use of a single HBA to provide a PMEM HBA x1 arrangement. A given PMEM store is also referred to herein as a "local store" and may be viewed as an example of what is more generally referred to herein as a "persistent storage device."

The DRAM 304 is also referred to as a DRAM subsystem, and is coupled to the CPU 310 via a double data rate (DDR) interface denoted DDRx. The PMEM bridges 312 also communicate with their respective PMEM stores 306 via DDRx interfaces as shown.

The application server 301-1 as illustrated in FIG. 3 provides an improved data path for storage, including a hardware data plane for transferring data between an application running on the application server and a cold store such as that provided by the modified storage appliance 316. Under software control, this hardware data plane can support multiple system configurations including a durable configuration (i.e., able to withstand a power failure), a resilient configuration (i.e., able to withstand any single hardware failure), or a combined durable and resilient configuration, depending on the needs of the application. The application server 301-1 also implements a corresponding control plane for managing the data plane described above. In addition, the application server 301-1 implements functions and capabilities that can execute in concert with the data plane, such as, for example, an intelligent offload function that performs read ahead operations based on application pattern prediction, a tiering capability to provide data movement between an application local store and a cold store, a segregated data path in which the data plane is independent of the CPU DRAM subsystem, and a method for allowing inter-server data movement to permit data recovery after a fault has occurred. Such an arrangement advantageously allows system 300 to deliver storage functionality (e.g., durability and resilience) at or near DRAM speeds.

In the FIG. 3 embodiment, the dual ported HBAs 311 are coupled to the CPU 310 via respective primary ports that utilize a CXL protocol. The primary port of a given one of the dual ported HBAs 311 provides a cache coherent interface configured to transport cache lines to and from the CPU 310. The secondary ports of the respective dual ported HBAs 311 connect externally to the switching infrastructure 315, illustratively utilizing protocols such as Gen-Z and/or RDMA over converged Ethernet (ROCE). The secondary port of a given one of the dual ported HBAs 311 provides support for bulk data transfers to the modified storage appliance 316. Smaller data transfers are also supported. Inbound data transfers (e.g., written into the PMEM store across the secondary port) will cause a cache invalidation command to be transferred across the primary port to the CPU 310. This cache invalidation command will be received by logic within the CPU 310 that controls a cache subsystem of the CPU 310. The logic is configured to prevent invalid data from being consumed by the application.

The PMEM bridges 312 of the respective dual ported HBAs 311 in application server 301-1 are each configured to implement functionality for protocol bridging and simple acceleration (e.g., encryption, decryption, compression, decompression, etc.), and also provide sufficient local processing capability to support command initiation and response for both primary and secondary ports. The local processing is further configured to implement additional functions and capabilities such as the above-noted intelligent offload, tiering capability, and inter-server data movement after occurrence of a fault.

Figure 4:
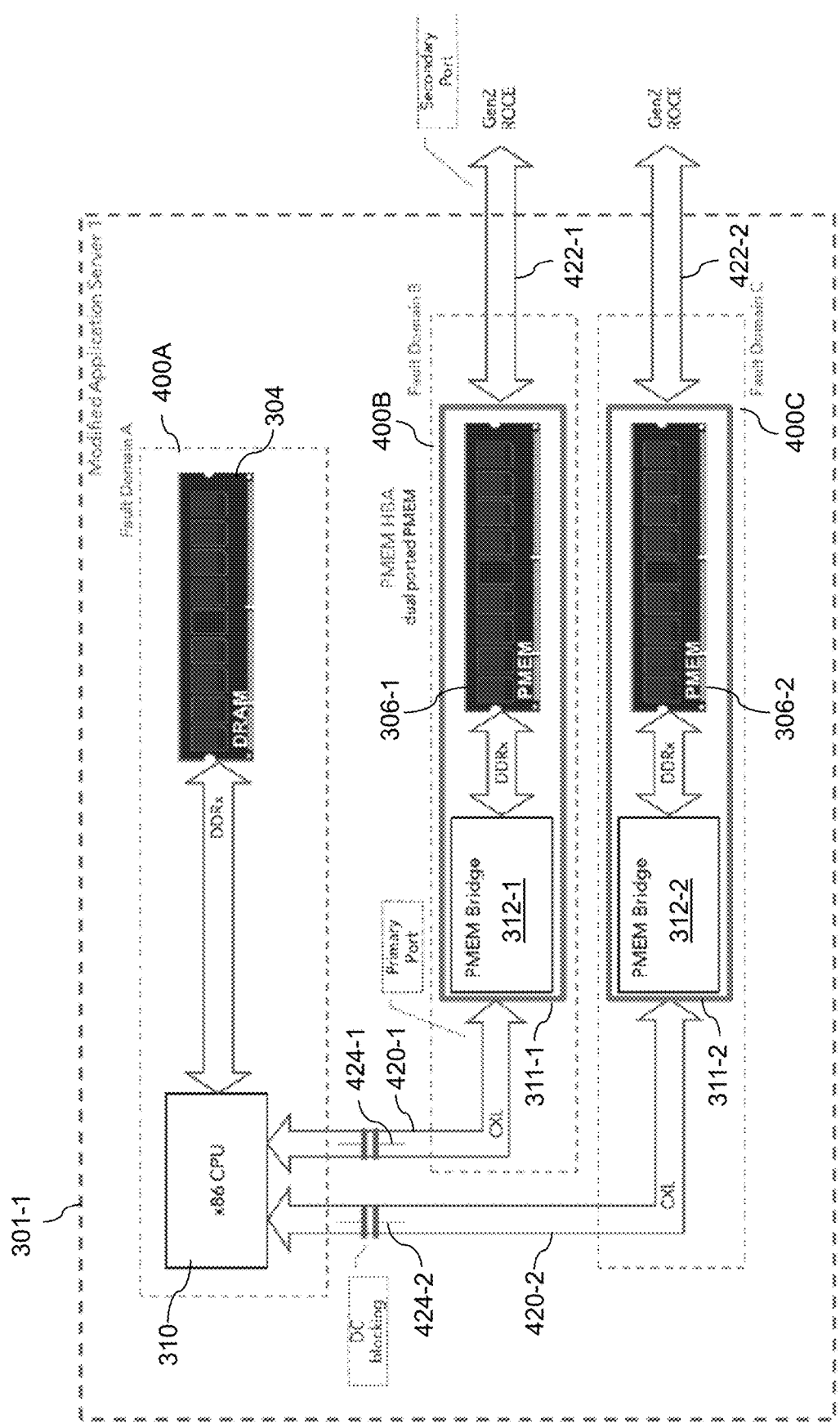
FIG. 4 shows a more detailed view of a particular one of the application servers of the FIG. 3 system.

FIG. 4 shows a more detailed view of the first application server 301-1, illustrating its multiple fault domains. There are three distinct fault domains in this embodiment, denoted 400A, 400B and 400C, and also referred to as Fault Domain A, Fault Domain B and Fault Domain C. The CPU 310 and DRAM 304 are within Fault Domain A, and the dual ported HBAs 311 and their corresponding PMEM bridges 312 and PMEM stores 306 are in respective ones of Fault Domain B and Fault Domain C.

As indicated previously, the dual ported HBAs 311-1 and 311-2 communicate with the CPU 310 over respective primary ports 420-1 and 420-2 using CXL links, and communicate with the switching infrastructure 315 and modified storage appliance 316 over respective secondary ports 422-1 and 422-2 using Gen-Z and/or ROCE links. Other arrangements of ports and protocols can be used in other embodiments.

Applications execute on the CPU 310 within Fault Domain A, also referred to herein as a "primary fault domain." Application data is stored in the PMEM stores 306 of the dual ported HBAs 311 of respective Fault Domain B and Fault Domain C. Data is transferred across fault domains using high-speed serial interconnects such as the above-noted CXL interconnects. These interconnects are provisioned with DC blocking capacitors 424-1 and 424-2 to prevent faults from crossing domains. The protocols utilized to communicate over these interconnects, the hardware implementing the protocols, and the software controlling that hardware are all likewise hardened to ensure that faults cannot cross domains.

Although not explicitly illustrated in the figure, multiple power supplies are associated with the application server 301-1 and are arranged to ensure that a single failure cannot affect all of the power supplies. For example, two separate power supplies of the application server 301-1 can be interconnected using isolation hardware to ensure that a single failure cannot affect both supplies. This isolation hardware is illustratively used to create three power rails from two individual power supplies, with each power rail maintaining power when either individual power supply is available. Each of the power rails feeds a single corresponding one of the three fault domains 400A, 400B and 400C, and each power rail can fault and not propagate that fault to the other power rails. In the event of a failure in the primary fault domain (i.e., Fault Domain A), the dual ported HBAs 311 remain accessible over their respective secondary ports 422. This ensures that the data contained within each HBA is still accessible within system 300 even in the event of a failure in the primary fault domain containing CPU 310 and DRAM 304.

In some embodiments, the dual ported HBAs 311 are implemented as a pair of isolated, serviceable cards, each with independent power, with the cards being isolated from the CPU 310 of the application server 301-1 by the respective DC blocking capacitors 424, although numerous other implementations are possible. In a card-based arrangement of this type, data can be replicated from the first card to the second card by one of several mechanisms (e.g., under software control, via dedicated hardware on the card, via external commands sent via the secondary port and/or via special CPU instructions). Examples of special CPU instructions include the above-noted resilient data move instructions as described in U.S. patent application Ser. No. 16/444, 577.

Figure 5:
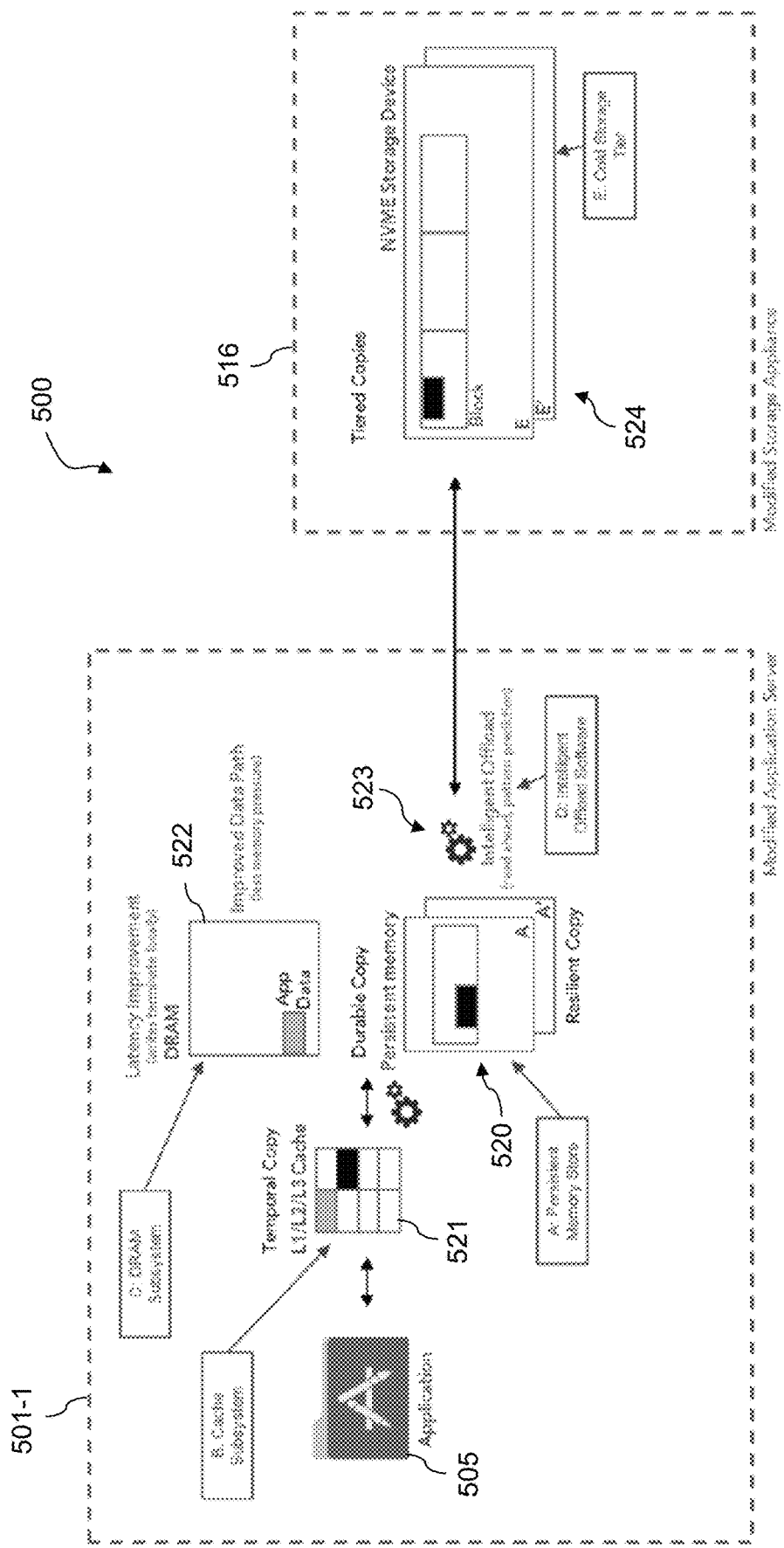
FIG. 5 is a functional diagram illustrating different aspects of the operation of an application server with multiple fault domains in an illustrative embodiment.

FIG. 5 shows another system 500 which includes an application server 501-1 that is configured in a manner similar to that previously described in conjunction with the application server 301-1 of FIGS. 3 and 4. The application server 501-1 communicates with a storage appliance 516. An application 505 executes on a CPU or other host processor of the application server 501-1. The application server 501-1 as shown in the figure also includes a persistent memory store 520, a cache subsystem 521 comprising a multi-level cache (e.g., an L1/L2/L3 cache, where L1, L2 and L3 denote different cache levels), a DRAM subsystem 522 and intelligent offload software 523. Although not shown in the figure, a switching fabric or other type of switching infrastructure is assumed to interconnect the application server 501-1 to the storage appliance 516.

The persistent memory store 520 more particularly comprises two instances of the PMEM stores previously described, each implemented in a separate dual ported HBA. These two instances illustratively comprise respective PMEM devices denoted A and A' in the figure. Both of these are devices are assumed to be accessed at DRAM speed and are independent of the DRAM subsystem 522. The modified storage appliance 516 implements a cold storage tier 524 that contains two NVMe devices denoted as E and E' respectively. Again, references herein to "modified" components should not be construed as limiting in any way, nor as admissions regarding conventional arrangements.

It is assumed for this embodiment that the application 505 interacts with the PMEM devices of the persistent memory store 520 using an object addressing mechanism, although other types of addressing mechanisms, such as byte addressing or block addressing, can be used in other embodiments.

An example of an object stored in the persistent memory store 520 and the cold storage tier 524 is illustrated by the solid block in the figure. Such an object is referred to as a temporal copy in cache 521, is referred to as a durable copy and a resilient copy in respective PMEM devices A and A' and is referred to as a tiered copy in cold storage tier 524. An example of application data comprising an object stored in the cache 521 and the DRAM subsystem 522 is illustrated by the shaded block in the figure.

It is further assumed that the application 505 has been running for some time and has therefore generated numerous objects, and that the total size of those objects greatly exceeds the capacity of the PMEM devices. Accordingly, most of the objects generated by the application 505 are now stored in the cold storage tier 524, but there are a few objects stored locally in the persistent memory store 520.

Given this current state of the system 500, assume that the application 505 now opens an existing object which is stored in the cold storage tier 524. The application writes to that object, and then closes it. The result of these actions is that there is new application data on devices A and A' and there is stale application data on devices E and E'. In other words, the devices E and E' in the cold storage tier 524 are out of synchronization with the devices A and A' of the persistent memory store 520.

Eventually, the local application data (i.e., the data on devices A and A') will likely be pushed out to the cold storage tier 524 thereby resynchronizing the data, but assume that a hardware failure occurs prior to that.

If device A fails, device A' has a copy of the local application data. Likewise, if device A' fails, device A has a copy of the local application data. In either case, there is no data loss.

If the application server 501-1 fails prior to the data being transferred from A to E (and from A' to E'), the cold storage tier 524 can pull the data off the faulty server using the techniques described above. Again, there is no data loss.

A data plane of the type described above can, under software control, be configured in a durable and/or resilient configuration, depending on the needs of the application.

Signaling, to indicate that replication should occur, can be initiated indirectly by the application both in load/store as well as traditional read/write environments.

The application server 501-1 advantageously provides latency improvements, in that writes terminate locally, as well as an improved data path with less memory pressure and intelligent offload using read ahead and pattern recognition.

The particular arrangements illustrated in FIGS. 3, 4 and 5 are presented by way of example only, and can be varied in other embodiments.

It is apparent from the above that illustrative embodiments disclosed herein can provide a number of significant advantages relative to conventional arrangements. For example, one or more embodiments provide enhanced data resiliency and system fault tolerance using PMEM or SCM devices.

Illustrative embodiments allow memory services and features involving PMEM or SCM devices to be implemented very "near" to applications executed by a host processor. This advantageously allows the applications to leverage the very low latencies associated with some types of PMEM or SCM devices, thereby avoiding conventional I/O storage transaction latencies, which can be orders of magnitude greater than the PMEM or SCM latencies.

Using a data path of the type disclosed in conjunction with illustrative embodiments herein, any single failure of a host processor or an associated persistent memory device can occur and the data is still accessible. Conventional systems are typically required to move their data across a network or fabric before they can claim resilience (i.e., an expensive data movement is a precondition to resilience). Such remote data movement required by conventional systems negates the latency advantages of the persistent memory.

The data path in illustrative embodiments makes full use of the performance of the underlying media. It can therefore be used to implement memory-centric architectures (MCAs) that support memory capacity scaling and larger data sets "closer" to processing as demanded by business analytics and numerous other applications, etc. Such embodiments add storage-like data reliability features to such memory-access speed fabrics.

In addition, illustrative embodiments can improve the performance of applications by reducing the latency and performance impact of storage. For example, applications that perform synchronous 10 generally have to wait for their data to be committed upon completion of the 10 operations, but the data path in illustrative embodiments delivers commit acknowledgements at local DRAM speeds. Such an arrangement exhibits significantly lower latency than conventional approaches and is an important driver of application performance improvements in illustrative embodiments.

It is to be appreciated that the particular advantages described above are associated with particular illustrative embodiments and need not be present in other embodiments. Also, the particular types of storage system features and functionality as illustrated in the drawings and described above are exemplary only, and numerous other arrangements may be used in other embodiments.

It was noted above that portions of a storage system or an associated information processing system as disclosed herein may be implemented using one or more processing platforms. Illustrative embodiments of such platforms will now be described in greater detail. These and other processing platforms may be used to implement at least portions of other storage systems or information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within a storage system or an associated information processing system. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of a storage system or an associated information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a CPU, a microprocessor, a microcontroller, an application-specific integrated circuit (ASIC), a field-programmable gate array (FPGA), a graphics processing unit (GPU) or other type of processing circuitry, as well as portions or combinations of such circuitry elements.

The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of an information processing system over any type of network or other communication media.

As indicated previously, components of a storage system or an associated information processing system as disclosed herein can be implemented at least in part in the form of one or more software programs stored in memory and executed by a processor of a processing device. For example, at least portions of the functionality of application servers having multiple fault domains as described herein are illustratively implemented in the form of software running on one or more processing devices.

It should again be emphasized that the above-described embodiments of the invention are presented for purposes of illustration only. Many variations and other alternative embodiments may be used. For example, the disclosed techniques are applicable to a wide variety of different types of information processing systems, utilizing various arrangements of host processors, storage devices, non-volatile and volatile memories, memory controllers and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A system comprising:
   a host processor;
   a volatile memory device coupled to the host processor;
   at least a first persistent memory device coupled to the host processor;
   the host processor being configured to execute one or more applications;
   the volatile memory device and the first persistent memory device being in respective distinct fault domains of the system;
   wherein at least one of a plurality of data objects generated by a given one of the applications is accessible from multiple distinct storage locations in respective ones of the distinct fault domains; and
   wherein the host processor, the volatile memory device and the first persistent memory device are part of a first application server of the system, the first application server thereby comprising at least a portion of each of the distinct fault domains.

2. The system of claim 1 wherein the host processor and the volatile memory device are in a first one of the distinct fault domains and the first persistent memory device is in a second one of the distinct fault domains.

3. The system of claim 2 wherein the data object remains accessible in one of the first and second fault domains responsive to a failure in the other one of the first and second fault domains.

4. The system of claim 1 wherein the first persistent memory device comprises:
   a multi-ported host bus adaptor comprising a memory bridge coupled to a persistent memory;
   a first one of the ports of the multi-ported host bus adaptor being coupled to the host processor and providing a cache coherent interface configured to transport cache lines to and from the host processor; and
   a second one of the ports of the multi-ported host bus adaptor being coupled to a network of the system and being configured to support data transfers over the network to and from other processing devices of the system;
   wherein responsive to a failure in a first one of the fault domains comprising the host processor and the volatile memory device, the first persistent memory device remains accessible in a second one of the fault domains via the second port of the multi-ported host bus adaptor.

5. The system of claim 4 wherein an inbound data transfer received via the second port of the multi-ported host bus adaptor causes a cache invalidation command to be transferred via the first port of the multi-ported host bus adaptor to the host processor.

6. The system of claim 4 wherein the memory bridge of the multi-ported host bus adaptor implements local processing functionality including one or more of:
   storage protocol bridging;
   command initiation and response for the first and second ports;
   acceleration for at least one of encryption, decryption, compression and decompression;
   intelligent offloading of data objects from the persistent memory to other storage devices of the system;
   movement of data objects between multiple storage tiers of the system; and
   movement of data objects between multiple application servers of the system responsive to a failure in one of the application servers.

7. The system of claim 1 further comprising one or more additional application servers interconnected with one another and with the first application server via a network of the system.

8. The system of claim 7 wherein responsive to a failure in at least one of the host processor and the volatile memory device of the first application server, a particular one of the data objects generated by the given application and stored in a storage location of the first persistent memory device remains accessible over the network to at least one of the one or more additional application servers.

9. The system of claim 1 wherein the system further comprises a second persistent memory device coupled to the host processor and wherein the volatile memory, the first persistent memory device and the second persistent memory device are in respective first, second and third distinct fault domains of the system.

10. The system of claim 9 wherein a particular one of the data objects generated by the given application is stored in respective distinct storage locations of the first and second persistent memory devices.

11. The system of claim 10 wherein responsive to a failure in one of the first and second persistent memory devices, the data object remains accessible in the other one of the first and second persistent memory devices.

12. The system of claim 9 wherein one or more of the data objects are controllably offloaded from the first and second persistent memory devices to one or more other storage devices of the system under specified conditions.

13. The system of claim 12 wherein one or more of the data objects are controllably restored from the one or more other storage devices to the first and second persistent memory devices under specified conditions.

14. The system of claim 1 wherein data is transferred across the fault domains using high-speed serial interconnects provisioned with direct current blocking capacitors to prevent faults from crossing between the fault domains.

15. A method comprising:
to execute one or more applications utilizing a host processor of a system;
to provide accessibility to at least one of a plurality of data objects generated by a given one of the applications from multiple distinct storage locations in respective distinct fault domains of the system;
a first one of the distinct fault domains comprising a volatile memory device coupled to the host processor; and
a second one of the distinct fault domains comprising a first persistent memory device coupled to the host processor;
wherein the data object remains accessible in one of the first and second fault domains responsive to a failure in the other one of the first and second fault domains; and
wherein the host processor, the volatile memory device and the first persistent memory device are part of a first application server of the system, the first application server thereby comprising at least a portion of each of the distinct fault domains.

16. The method of claim 15 wherein the system further comprises one or more additional application servers interconnected with one another and with the first application server via a network of the system.

17. The method of claim 15 wherein the system further comprises a second persistent memory device coupled to the host processor and wherein the volatile memory, the first persistent memory device and the second persistent memory device are in respective first, second and third distinct fault domains of the system, a particular one of the data objects generated by the given application being stored in respective distinct storage locations of the first and second persistent memory devices, and wherein responsive to a failure in one of the first and second persistent memory devices, the data object remains accessible in the other one of the first and second persistent memory devices.

18. A computer program product comprising a non-transitory processor-readable storage medium having stored therein program code of one or more software programs, wherein the program code, when executed by a system comprising a host processor, a volatile memory device coupled to the host processor, and at least a first persistent memory device coupled to the host processor, causes the system:
to execute one or more applications utilizing the host processor;
to provide accessibility to at least one of a plurality of data objects generated by a given one of the applications from multiple distinct storage locations in respective distinct fault domains of the system;
a first one of the distinct fault domains comprising the volatile memory device; and
a second one of the distinct fault domains comprising the first persistent memory device
wherein the data object remains accessible in one of the first and second fault domains responsive to a failure in the other one of the first and second fault domains; and
wherein the host processor, the volatile memory device and the first persistent memory device are part of a first application server of the system, the first application server thereby comprising at least a portion of each of the distinct fault domains.

19. The computer program product of claim 18 wherein the system further comprises one or more additional application servers interconnected with one another and with the first application server via a network of the system.

20. The computer program product of claim 18 wherein the system further comprises a second persistent memory device coupled to the host processor and wherein the volatile memory, the first persistent memory device and the second persistent memory device are in respective first, second and third distinct fault domains of the system, a particular one of the data objects generated by the given application being stored in respective distinct storage locations of the first and second persistent memory devices, and wherein responsive to a failure in one of the first and second persistent memory devices, the data object remains accessible in the other one of the first and second persistent memory devices.

* * * * *